United States Patent
Prigent et al.

(10) Patent No.: US 7,458,411 B2
(45) Date of Patent: Dec. 2, 2008

(54) METHOD FOR MANUFACTURING CAST CERAMIC CORES FOR TURBOMACHINE BLADES

(75) Inventors: Serge Prigent, Asnieres sur Seine (FR); Christian Defrocourt, Franconville (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/286,387

(22) Filed: Nov. 25, 2005

(65) Prior Publication Data

US 2006/0219379 A1 Oct. 5, 2006

(30) Foreign Application Priority Data

Nov. 26, 2004 (FR) .................................. 04 52789

(51) Int. Cl.
*B22C 9/10* (2006.01)
*B22C 9/12* (2006.01)

(52) U.S. Cl. ........................... 164/28; 164/17; 164/369

(58) Field of Classification Search ................ 164/516, 164/369, 17, 15, 28
See application file for complete search history.

(56) References Cited

U.S. PATENT DOCUMENTS 5,465,780 A 11/1995 Muntner et al.

6,286,581 B1 9/2001 Gustafson

FOREIGN PATENT DOCUMENTS

| DE | 101 33 325 A 1 | 8/2002 |
|---|---|---|
| JP | 6-335816 | 12/1994 |
| WO | WO 97/02914 | 1/1997 |

OTHER PUBLICATIONS

"Master Catalog",,Kennametal Hertel, XP-002332315, 2001, 3 Pages.

*Primary Examiner*—Kevin P Kerns
(74) *Attorney, Agent, or Firm*—Oblon, Spivak, McClelland, Maier & Neustadt, P.C.

(57) ABSTRACT

A method of manufacturing a cast core with at least one recess, corresponding to a partition of a turbomachine blade, includes the steps of shaping, in a mold, a mixture containing a ceramic particles filler and an organic binder; forming a core rough casting without the recess in the mold; extracting the core rough casting from the mold; machining the recess in the core rough casting thereby forming a machined core with the recess; removing the organic binder from the machined core; and heat treating the machined core to consolidate the machined core. The step of machining the recess is performed before the step of heat treating the machined core.

16 Claims, 2 Drawing Sheets

METHOD FOR MANUFACTURING CAST CERAMIC CORES FOR TURBOMACHINE BLADES

The present invention relates to the manufacture of components such as the metal blading for turbomachines, having internal cavities of complex geometry that form cooling circuits in particular, using the lost wax casting technique.

The manufacture of such blading involves the step of producing a model in wax or some equivalent material comprising an internal component forming a casting core and featuring the cavities of the blading. An injection mould for wax is used to form the model, and the core is placed in this mould and wax injected thereinto. The wax model is then dipped several times into casting slips consisting of a suspension of ceramic particles in order to produce a shell mould. The wax is removed and the shell mould is baked. The blading is obtained by pouring molten metal which occupies the voids between the interior wall of the shell mould and the core. Using a seed or an appropriate selector and controlled cooling, the metal solidifies with the desired structure. Depending on the nature of the alloy and on the expected properties of the component resulting from the casting operation this may be directional solidification (DS) with a columnar structure, directional solidification with a single crystal grain structure (SX) or equiaxial solidification (EX). The first two families of components relate to superalloys for components subjected to high stresses, both thermal and mechanical, in the turbine engine, such as HP turbine blades.

Once the alloy has solidified, the shell and the core are knocked out. This results in the desired blading.

The casting cores used are made of a ceramic with a generally porous structure. They are produced from a mixture consisting of a refractory filler in the form of particles and of a more or less complex organic fraction forming a binder. Examples of compositions are given in patents EP 328452, FR 2371257 or FR 1785836. As is known, the casting cores are shaped by moulding using, for example, an injection-moulding machine. This shaping is followed by a binder removal operation during which the organic fraction of the core is eliminated by a means such as sublimation or thermal degradation, depending on the materials used. This results in a porous structure. The core is then consolidated by a heat treatment in an oven. A finishing step may be needed in order to eliminate and fettle the traces of the parting lines and obtain the final core geometry. Abrasive tools are used for this. It may also be necessary to strengthen the core to prevent it from being damaged in subsequent cycles of its use. If this is the case, then the core is impregnated with an organic resin.

Because of the complex geometry of the cores and, in particular, because of the presence of recesses that form the partitions once the metal alloy has been cast, the mould used for shaping the cores comprises a sometimes high number of moving subcomponents. The partitions of these subcomponents have undercuts with respect to the main direction of opening of the tool. These are regions of slight obliqueness with respect to the wall of the mould which tend to prevent the cast object from being extracted. These subcomponents corresponding to the partitions do, however, allow the complete core to be formed directly by injection.

This technique is commonly employed where there is a need to manufacture a high number of cores. This is the case with the manufacture of engine components in the series-production phase. However, it does have disadvantages when a limited number of cores is to be prepared, for example in the context of an engine development program. Producing injection moulding tooling that has a large number of subcomponents takes a time that is deemed to be excessive for simple development work. Its cost is also very high. Furthermore, the manual finishing operations are lengthy and demand a great deal of labour.

In the context of development engines, the method of injecting into a box containing multiple subcomponents is therefore unable to respond rapidly and economically to changes to the design of the core. Furthermore, the thicknesses required at the trailing edge of the cores are becoming increasingly slender. It is becoming difficult to obtain these using the known method.

In order to solve these problems, one known technique is to manufacture ceramic cores in a simplified mould that has no undercut partitions. The cores are then machined after baking in order to shape the recesses that form the partitions and the flow-disrupting features and the trailing-edge drillings. However, this technique has certain limits. Since a ceramic has no plastic domain, machining is done by abrasion. To this end, special diamond-tipped tools, which are very expensive, are used. In spite of this, the tools wear out quickly and the dimensional requirements of the core can no longer be respected. Furthermore, the cores also exhibit uneven shrinkage with respect to one another during the baking step and this means that adaptive machining has to be carried out if the abovementioned dimensional tolerances are to be respected. Adaptive machining consists in measuring the dimensions of each core using an appropriate measurement means then in comparing the measured data with values recorded in a numerical file relating to the desired core. According to the discrepancy between the values measured on the actual core and those in the numerical file, a software package calculates the path of the tool. These operations have to be carried out for each individual core.

A method, suited to engine development programs and that consists in forming the core layer by layer by adding successive strata of ceramic using a machine that employs a laser to sinter ceramic particles or using a machine comprising a nozzle depositing a colloid which binds ceramic particles together or alternatively using a machine which uses a laser to solidify a ceramic-particle-laden resin from which the binder is then removed before the ceramic is sintered, is also known. Although these techniques do not use injection-moulding tooling, the core manufacturing times are too lengthy. Furthermore, the dimensions are very difficult to control, particularly in the case of cores for moving blades, the trailing edges of which are very slender.

According to the invention, these problems are remedied using a method of manufacturing a cast core comprising at least one recess, such as a partition recess, for a turbomachine blade in particular, comprising the shaping in a mould of a mixture containing a ceramic particles filler and an organic binder, extraction from the mould, removal of the binder and a heat treatment to consolidate the core. This method is characterized in that a core rough casting without the said recess is formed in the said mould and in that the said recess is machined once the rough casting has been extracted from the mould and before the heat treatment operation.

By virtue of the invention, the costs and timescales involved in obtaining cast cores are reduced. Whereas the time taken to obtain a core by injection moulding in a mould with a partition exhibiting undercuts is three to four months, the time taken using the technique of the invention is brought down to three or four weeks. The solution also adds significantly to the flexibility and responsiveness to changes in design and contributes to the obtaining of cores having more slender trailing edges, as small as 0.1-0.3 mm, than could be obtained using the method of the prior art. It is also found that, by virtue of this method, the amount of handling of the cores is reduced, thus reducing the reject rate.

Advantageously, the machining operation is performed mechanically by milling with the removal of chips. Indeed it has been found surprisingly that the core could be worked after it had been moulded and before it had yet undergone the consolidation heat treatment. In this state, the core has a plastic consistency and can be handled and worked while at the same time retaining its shape. In addition, the cores also have uniform shrinkage with respect to one another after the moulding operation (they are geometrically identical). Contrary to the earlier solutions, it is therefore not necessary to measure the cores and compare their dimensions against the dimensions recorded in a numerical file relating to the core. In the context of the present invention, no adaptive machining is needed.

More particularly, the core comprises 80 to 85% of inorganic filler and 15 to 20% of organic binder. The composition advantageously corresponds to one of those described in the applicant company's patent EP 328452.

According to another feature, machining is performed by successive passes of the tool removing a determined thickness of material, ranging between 0.1 and 2 mm, on each pass. In particular, the machining operation is performed using a milling cutter by removing material on an at least three-axis and preferably a four-axis or a five-axis milling machine. Through this approach, the machining can be automated.

This technique allows a non-baked core to be machined from the existing CAD-CAM (computer-aided design/computer-aided manufacture) file without being penalized by the shrinkage of the core during the baking step, which shrinkages are not always the same. The unbaked core has the dimensions of the mould in which it was manufactured. Advantageously, the cores prior to baking are geometrically identical.

According to another feature, the machining operation involves a step of radiusing the portion between the surface of the rough casting and the recess.

In this way, recesses of varying shapes corresponding to the various structural elements of the core can be produced. In particular, it is possible to produce a through-opening which, once the metal alloy has been poured, forms a dividing partition in a turbomachine blade cooling circuit. It is also possible to produce a through-opening which, after casting, forms a dividing partition between two cooling-fluid discharge drillings in a trailing edge of a turbomachine blade. It is also possible to produce a recess that is not a through-opening and that after casting forms a feature that disrupts the flow. Other forms are possible.

To implement the method use is made of a milling tool comprising a head with a diameter ranging between 0.3 and 0.8 mm and a helical cutting flute the helix angle of which ranges between 40 and 60 degrees.

Other features and advantages will become apparent from reading the description which follows of one embodiment of the method of the invention with reference to the attached drawings in which.

The description that follows corresponds to the application of the invention to the formation of a cast core for a high-pressure turbine blade in a gas turbine engine for aeronautical or land-based use. This embodiment is non-limiting.

Figure 1:
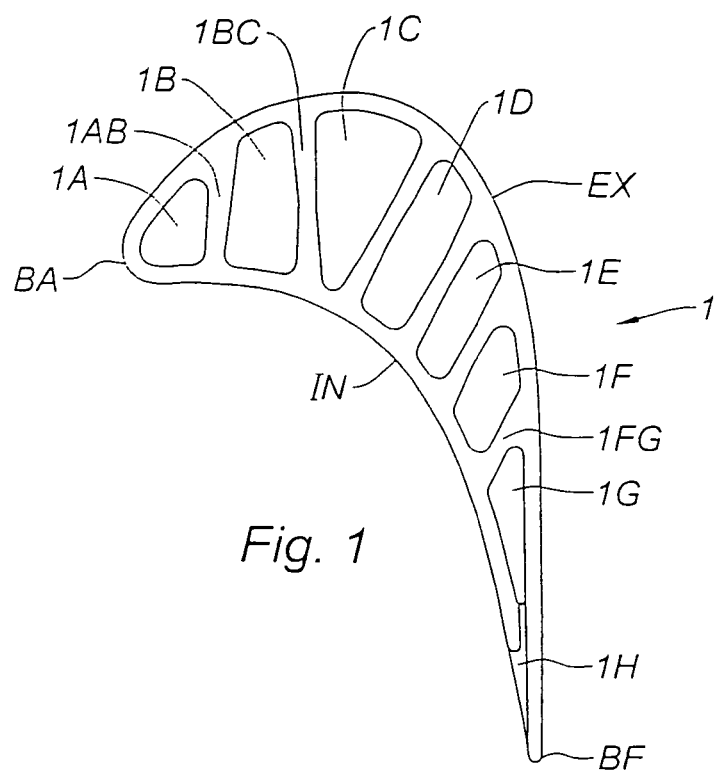
FIG. 1 is a view in section of a cooled turbine blade.

As can be seen in FIG. 1, a turbine blade 1 comprises a pressure face surface IN, a suction face surface EX, a leading edge BA and a trailing edge BF. In the case of a high-pressure turbine blade for a gas turbine engine for aeronautical use, the blade comprises internal cavities, in this instance 7: 1A to 1G. The trailing edge comprises an opening fed from the last cavity 1G so that the cooling fluid which is air tapped from the compressor can escape.

The cavities are separated from one another by partitions: 1AB, 1BC, etc. When these blades are manufactured by casting a molten metal, the shell mould has to incorporate a core that occupies the voids of the cavities that are to be formed in the blade. The core, as can be determined from FIG. 1, is complex. In particular it comprises recesses corresponding to the partitions, which are not simple to produce. Specifically, this core is produced by injection-moulding in a mould in which undercuts need to be formed to embody these recesses. The conventional technique is to design the mould with subcomponents which have a certain degree of mobility so that the core can be extracted once the material has been injected into the mould. As was explained above, manufacturing this type of mould with moving subcomponents is a very lengthy and expensive process. The object of the invention is to produce a core that has a complex structure such as this but does not require a mould of the same complexity to be produced.

According to the invention, a simplified mould is produced, that is to say that a mould is produced that has no moving subcomponents or at least has a reduced number of moving subcomponents. Within the meaning of the invention, a mould is said to be simplified if it has at least one recess, such as a partition recess, comprises no corresponding subcomponent and if this recess has to be shaped by machining.

Figures 2, 3:
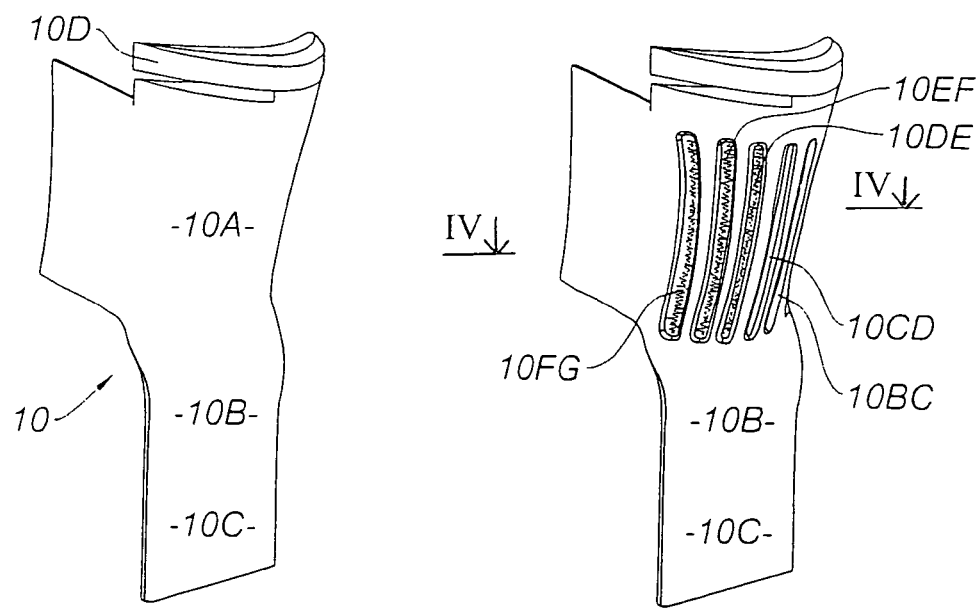
FIG. 2 depicts, in perspective, a core rough casting once it has been extracted from a simplified mould.
FIG. 3 depicts the core of FIG. 2 after the machining of the recesses in accordance with the invention.

FIG. 2 shows the core 10 resulting from such a simplified mould. This core 10 comprises a part corresponding to the cavities in the vane 10A, a part 10B corresponding to the blade root cavities and a part 10C that forms a handle for handling during manufacture. At the tip of the vane it is possible also to see a part 10D corresponding to what is known as the "bathtub" in the terms of the art. This part in this instance is separated from the part 10A by a transverse recess. This recess forms the end wall of the "bathtub" after casting.

To manufacture this core rough casting, an appropriate mixture has been produced. This is, in particular, an organic binder associated with an inorganic filler. For example, the mixture is produced in accordance with the teachings of patent application EP 328452. The core handles well and its make-up allows it to be worked using a milling tool that removes chips.

Figure 5:
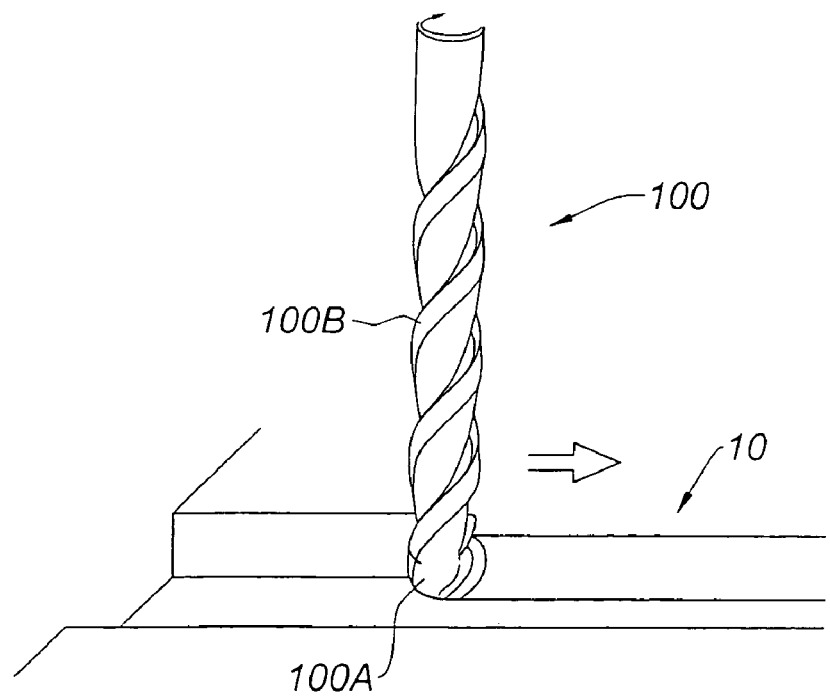
FIG. 5 shows the method of machining using a milling cutter.

The next step is to machine, in this rough casting 10, the recesses that were not provided for by the mould. Machining is advantageously performed using a tool such as shown in FIG. 5. This is a milling cutter 100 comprising a cutting end 100A and a helical cutting flute or edge along its shank 100B. The recess to be machined for example has a width of 1 mm. The milling cutter is moved at right angles to the surface that is to be machined at a depth with respect to this surface of, in the case of a turbine blade, between 0.1 and 0.5 mm. The speed of the tool and its rate of advance are also fixed. The loadings on the material are thus limited and flexing of the tool is avoided. The head of the tool advantageously has a diameter ranging between 0.3 and 0.8 mm depending on the width of the recess to be made in the core. Machining progresses in this way, milling out determined depths of material in successive steps until the core is penetrated. A clearance is preferably maintained during this phase and, once the core has been fully penetrated, the exact profile to be obtained is milled out running the milling cutter on its shank.

Use is preferably made of a numerically controlled machine tool of the five-axis type, having, for example, three axes for positioning the milling cutter in space and two axes for positioning the core. This machine can easily be programmed to automate the machining of the recesses.

A recess is completed by a radiusing operation. The parameters such as the cutting speed, the rotational speed of the tool, its path and its diameter are defined.

Blading cores now have increasingly slender trailing edges. It is difficult to obtain these using the injection-moulding method of the prior art. The method of the invention makes it possible to produce a rough casting with a relatively thick trailing edge and to machine this part in order to obtain the desired thickness, down to 0.15 mm.

Figure 4:
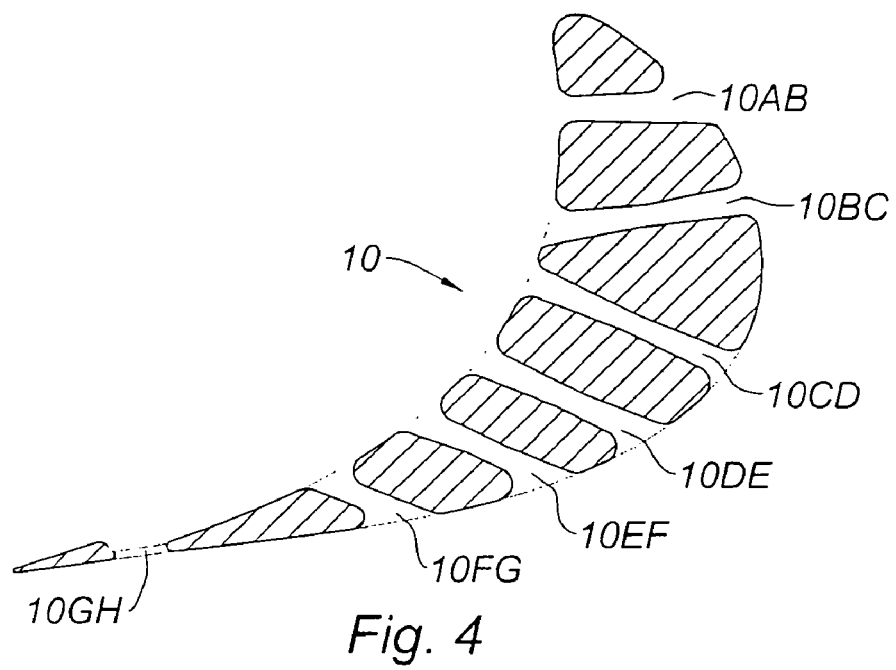
FIG. 4 is a section on IV-IV of FIG. 3.

FIGS. 3 and 4 show the core 10 once it has been machined. The recesses 10AB, 10BC, etc., which are longitudinal and more or less in the axial direction of the blade are through-openings and have the width of the partitions 1AB, 1BC, etc., that they will form, give or take shrinkage, in the component once the molten metal has been cast in the shell mould.

Once the core has been machined, the method moves on to the next treatments, known per se, in the process of manufacturing cast cores. This process involves binder removal, that is to say the removal of the organic binder. To this end, the core is heated to a temperature high enough to degrade the organic components it contains. The other steps involve then heating the core to the temperature required to sinter the ceramic particles of which it is made. If additional consolidation is required, then it is impregnated with an organic resin.

The depictions are essentially confined to the partition recesses because the solution provides a substantial simplification to the geometry of the moulds used for shaping cores. However, it may be extended to the machining of any part of the core. For example, this technique makes it possible to produce parts of the core which are very slender, such as the part of the core situated near the trailing edge and comprising the ducts for the passage of air escaping from inside the blade at the end of the cooling circuit and injected into the gas stream.

The invention claimed is:

1. A method of manufacturing a cast core with at least one recess, corresponding to a partition of a turbomachine blade, said method comprising:
    shaping, in a mold, a mixture containing a ceramic particles filler and an organic binder;
    forming a core rough casting without said recess in said mold;
    extracting said core rough casting from the mold;
    machining said recess in said core rough casting thereby forming a machined core with said recess;
    removing the organic binder from said machined core; and
    heat treating said machined core to consolidate the machined core,
    wherein said step of machining said recess is performed before the step of heat treating said machined core.

2. A method according to claim 1, wherein the machining step is performed mechanically by milling with a removal of chips.

3. A method according to claim 2, wherein the machining step is performed by successive passes with a determined thickness ranging between 0.1 and 2 mm.

4. A method according to claim 1, wherein the machining step is performed with a milling cutter by removing material on an at least three-axis milling machine.

5. A method according to claim 1, wherein the machining step involves a step of radiusing a portion between a surface of the core rough casting and the recess.

6. A method according to claim 1 for the manufacture of a core comprising a plurality of recesses, wherein the mold comprises a number of moving subcomponents lower in number than a number of recesses in the core.

7. A method according to claim 1, wherein the recess is a through-opening and after casting forms a dividing partition in a turbomachine blade cooling circuit.

8. A method according to claim 1, wherein the recess is a through-opening and after casting forms a dividing partition between two cooling-fluid discharge drillings in a trailing edge of a turbomachine blade.

9. A method according to claim 1, wherein the recess is not a through-opening and after casting forms a feature that disrupts flow.

10. A method according to claim 2, wherein the milling step is performed with a milling tool comprising a head with a diameter ranging between 0.3 and 0.8 mm and a helical cutting flute with a helix angle ranging between 40 and 60 degrees.

11. A method according to claim 1, wherein said step of heat treating is performed before any step of pouring molten metal in said cast core.

12. A method according to claim 11, wherein said step of machining said recess is performed on said core rough casting after said step of extracting said core rough casting from said mold and before any step of heating said core rough casting so that said step of machining is performed on a non-baked core.

13. A method according to claim 11, wherein said mixture comprises 80 to 85% of said ceramic particles filler and 15 to 20% of said organic binder.

14. A method according to claim 11, wherein said step of removing the organic binder from said machined core is performed by heating said machined core to a temperature sufficient to degrade organic components of said binder.

15. A method according to claim 14, wherein said step of heat treating said machined core is performed by heating said machined core to a temperature sufficient to sinter ceramic particles of said ceramic particles filler.

16. A method of manufacturing a turbomachine blade comprising the method of manufacturing the cast core of claim 15, and further comprising a step of pouring molten metal in said cast core so as to fill at least said recess thereby forming said partition of said turbomachine blade.

* * * * *